United States Patent [19]

Lombardo

[11] 4,376,341
[45] Mar. 15, 1983

[54] TOOL-TO-WORKPIECE ANGLE GAUGE

[76] Inventor: Sebastian P. Lombardo, 5140 SW. 40th Ave., Ft. Lauderdale, Fla. 33314

[21] Appl. No.: 298,806

[22] Filed: Sep. 2, 1981

[51] Int. Cl.³ .......................... G01B 3/56; B27G 23/00
[52] U.S. Cl. .................................. 33/174 S; 33/185 R
[58] Field of Search ............. 33/174 S, 185 R, 172 D, 33/169 C

[56] References Cited

U.S. PATENT DOCUMENTS

| | | | |
|---|---|---|---|
| 2,413,841 | 1/1947 | Minuto | 33/174 S |
| 3,148,454 | 9/1964 | Anderson | 33/174 S |
| 3,672,065 | 6/1972 | Voss | 33/185 R |

Primary Examiner—Harry N. Haroian
Attorney, Agent, or Firm—Harvey B. Jacobson

[57] ABSTRACT

A base block is provided having a pair of laterally spaced, downwardly facing and constant radius arcurate bearing surfaces generated about parallel axes lying in a reference plane. A shank assembly including an exposed shank portion is mounted from the base block for oscillation about a third axis paralleling the aforementioned axes and with the exposed shank disposed and swingable in a plane normal to the third axis. The block and shank assembly include co-acting indicating structure operative to indicate when the shank assembly is rotated about the third axis relative to the base block to a position with the exposed shank disposed normal to the aforementioned reference plane.

7 Claims, 6 Drawing Figures

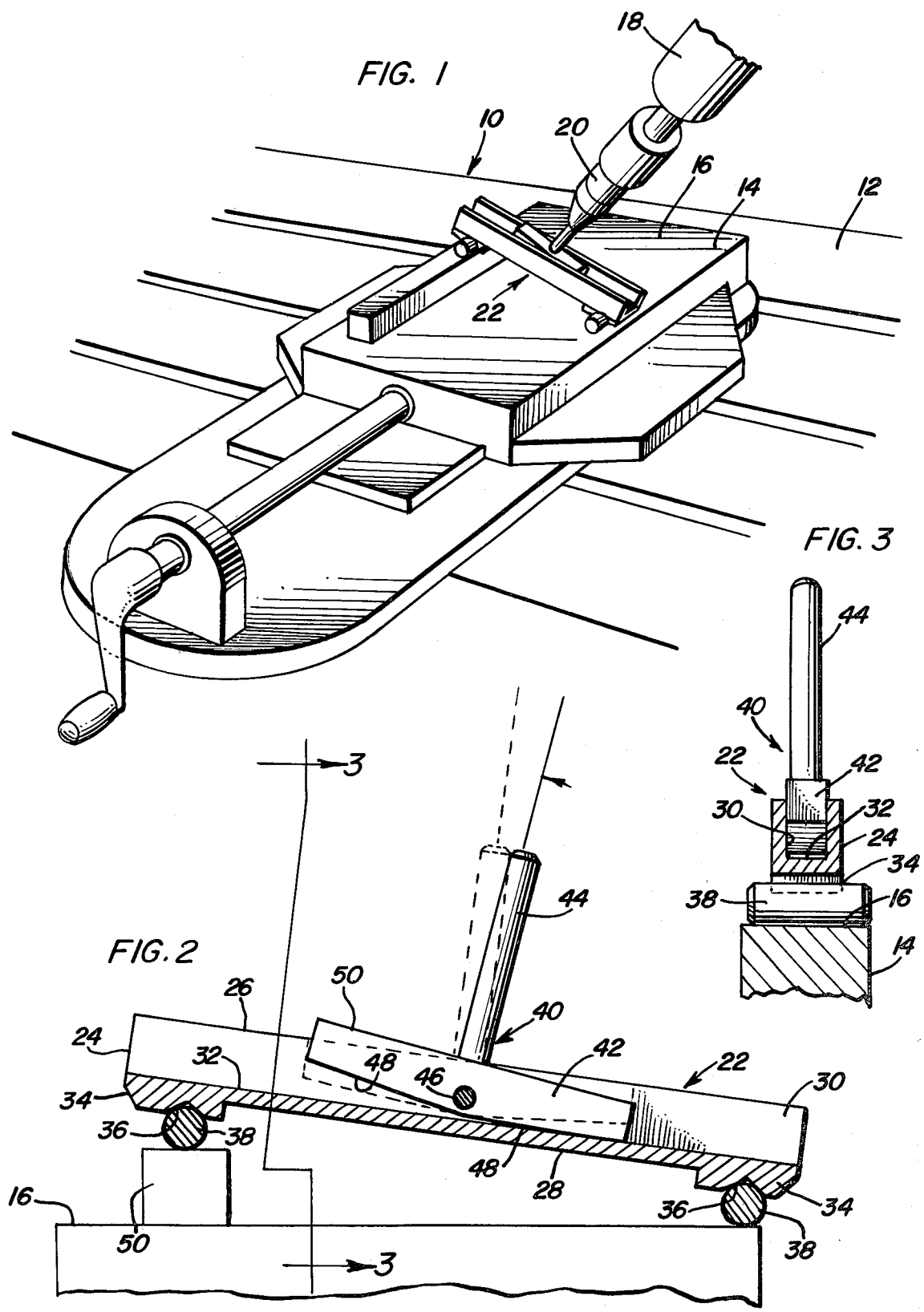

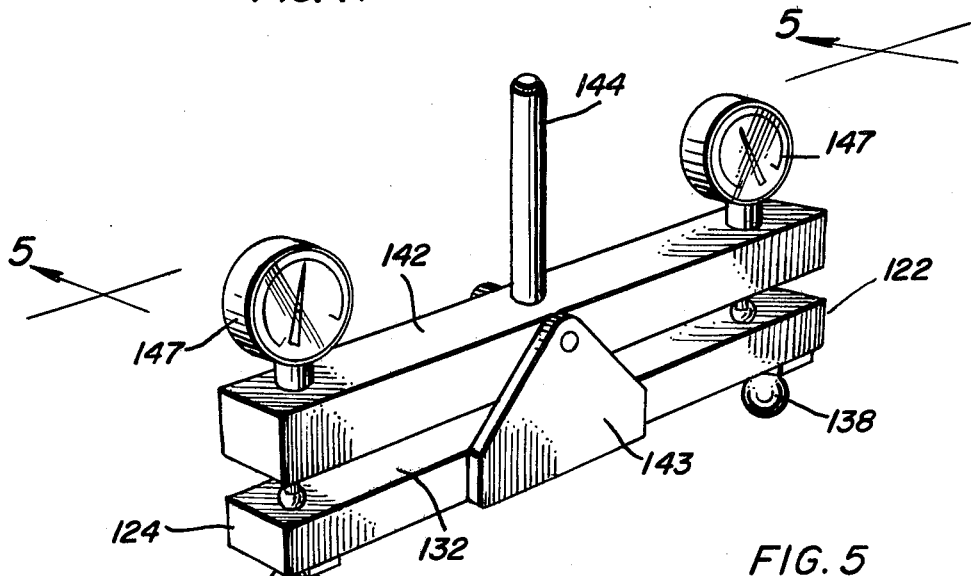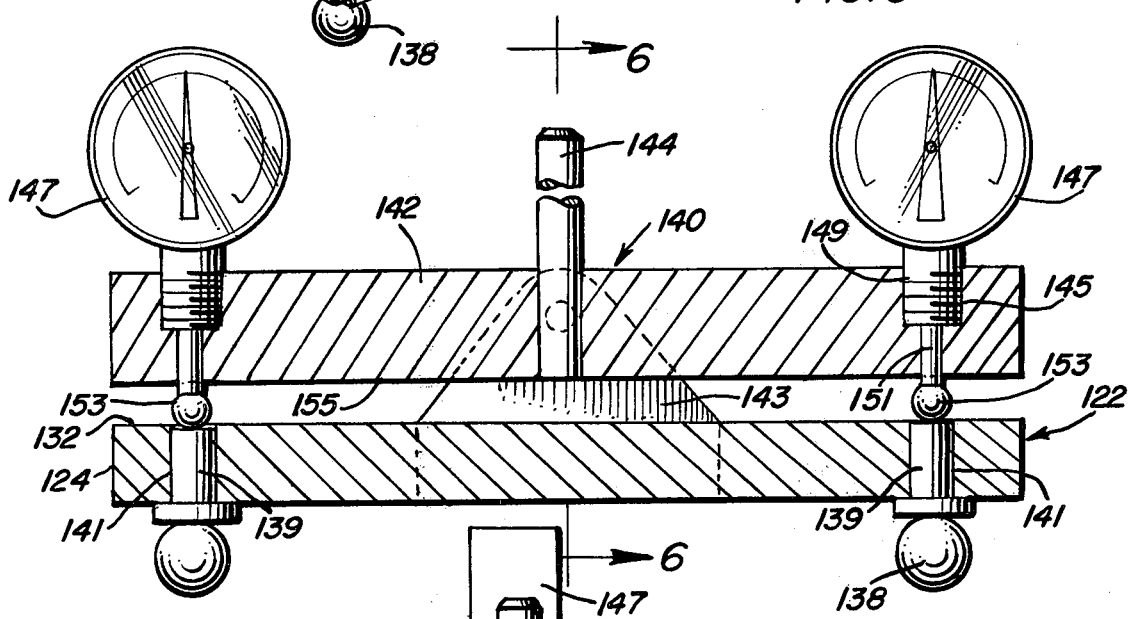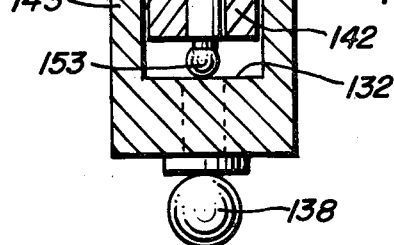

TOOL-TO-WORKPIECE ANGLE GAUGE

BACKGROUND OF THE INVENTION

Various cutting and drilling machines such as vertical mills and drill presses include adjustable heads whereby the angle of the cutting tool thereof relative to a base plate or bed may be adjusted as desired. Numerous tools heretofore have been designed to enable such adjustable heads to be substantially correctly angularly positioned, but most of these tools do not include structure which is particularly well adapted to enable precise tool head adjustment when the tool head includes a rotary chuck or the like to be engaged with a rotary shank portion of an associated tool. Accordingly, a need exists for an improved form of gauge or similar tool which may be used in conjunction with a vertical mill or drill press and the like including an adjustable head for enabling the head to be precisely angularly adjusted as desired.

Examples of previously known forms of tools including some of the general structural and operational features of the instant invention are disclosed in U.S. Pat. Nos. 2,306,227, 3,195,238, 3,200,503, 3,282,132, 3,626,513, 3,763,570, 3,813,989 and 4,010,943.

BRIEF DESCRIPTION OF THE INVENTION

The angle gauge of the instant invention includes a sine block to be used in a conventional manner, but the sine block includes a planar surface which parallels the reference plane of the block and relative to which an inverted T-head is oscillatably supported with the T-head including a crosshead portion and a shank. The crosshead portion includes a plane surface disposed precisely coextensive with the planar surface of the block when the shank is disposed precisely normal to the reference plane of the block. In this manner, when the reference plane of the block has been precisely inclined as desired relative to the bed or support surface of the associated machine and the head of the machine engaged with the shank is slightly misinclined, the plane surface of the T-head will be slightly visually inclined relative to the immediately adjacent planar surface of the block and a slight corrective inclination of the tool head may be effected until the plane surface of the T-head is coextensive or flush with the planar surface of the block.

The main object of this invention is to provide a workpiece angle gauge of the sine block type and including structure whereby a slight misinclination of a tool head relative to a properly blocked sine block may be readily determined and corrected.

Another object of this invention is to provide an angle gauge which may be effectively utilized in conjunction with substantially all adjustable head machines of the type adapted to engage a supportive shank portion of a rotary tool.

Still another important object of this invention is to provide an angle gauge which may be used for squaring purposes.

A further object of this invention is to provide an angle gauge in accordance with the preceding objects and constructed in a manner whereby machinists and other persons utilizing vertical mills and drill presses as well as other similar machines may achieve correct angular adjustment of the heads thereof, even if they do not have a great deal of experience in operating such machines.

A final object of this invention to be specifically enumerated herein is to provide an angle gauge in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a machine bed with which the angle gauge of the instant invention has been operatively associated to enable an adjustable angle head of the machine to be precisely adjusted relative to the machine bed;

FIG. 2 is an enlarged vertical sectional view taken substantially upon a plane passing through the longitudinal center of the tool illustrated in FIG. 1;

FIG. 3 is a transverse vertical sectional view taken substantially upon the plane indicated by the section line 3—3 of FIG. 2;

FIG. 4 is a perspective view of a modified form of gauge;

FIG. 5 is an enlarged vertical sectional view taken substantially upon the plane indicated by the section line 5—5 of FIG. 4; and FIG. 6 is a fragmentary transverse vertical sectional view taken substantially upon the plane indicated by the section line 6—6 of FIG. 5.

DETAILED DESCRIPTION OF THE INVENTION

Referring now more specifically to the drawings the numeral 10 generally designates a machine including a bed 12 having a workpiece support plate 14 mounted thereon and adjustable relative to the bed 12. The support plate 14 includes a planar upper surface 16 and the machine 10 includes a tool head 18 supported therefrom for angular adjustment. The head 18 includes a rotary chuck 20 in which a cylindrical shank portion of a cutting tool (not shown) may be chucked.

The support plate 14 is provided to support a workpiece (not shown) therefrom in relation to the head 18 and either the head 18 or the support plate 14 may be moved relative to the other in order to advance a tool bit whose shank portion is supported from the chuck 20.

The head 18 is adjustable relative to the base 12 and may be angularly displaced about a horizontal axis paralleling the base 12 and also advanced along its longitudinal center line with which the shank of the associated tool bit is coaxial.

In order to mill an inclined surface or to drill an inclined bore, the head 18 is inclined relative to the base 12 whereby the desired angled milling or drilling may be accomplished on a workpiece supported from the plate 14. Although the head 18 may have relatively movable angle indicating indicia thereon enabling the head to be inclined, generally, to the desired angle relative to the bed 12, such registering indicia are not precise. Accordingly, it is conventional to provide some form of gauge whereby the desired angle of the chuck relative to the support plate 14 may be achieved and it is for this purpose that the gauge of the instant invention is provided, the gauge being generally designated by the reference numeral 22.

With attention now invited more specifically to FIGS. 2 and 3 of the drawings, it may be seen that the gauge 22 includes a rectangular bar 24 having plane upper and lower surfaces 26 and 28 which parallel each other. The bar 24 has a longitudinal groove 30 formed therein and the bottom 32 of the groove 30 parallels the upper and lower surfaces 26 and 28.

The opposite ends of the bar 24 include integral downwardly projecting foot portions 34 having transverse downwardly opening V-grooves 36 formed therein and cylindrical feet 38 are seated and secured in the grooves 36. The cylindrical surfaces of the feet 38 are generated about parallel axes disposed in a reference plane which parallels the surfaces 26 and 28 as well as the bottom 32.

An inverted T-head referred to in general by the reference numeral 40 and defining a shank assembly is provided and the T-head or shank assembly 40 includes a crosshead portion 42 and a cylindrical shank portion 44. The crosshead portion 42 is pivotally supported within the groove 30 by pivot pin 46 for oscillation about an axis which parallels the center axes of the feet 38 and the underside of the crosshead portion 42 includes undersurface portions 48 which are abuttingly engageable with the bottom 32 of the groove 30 in order to limit oscillation of the T-head 40 relative to the bar 24. The T-head 40 may be oscillated between a first limit position such as that illustrated in solid lines in FIG. 2 of the drawings and a second limit position disposed on the opposite side of the phantom line position of the T-head 40 illustrated in FIG. 2. The crosshead portion 42 includes a plane surface 50 which is co-planar with the upper surface 26 when the T-head 40 is in its approximate center position and the shank portion 44 is disposed normal to the plane surface 50 and to the aforementioned reference plane containing the center axes of the feet 38.

It will be noted that the upper surface 26 includes co-planar portions which are disposed on opposite sides of the groove 30 and, therefore, that the plane surface 50 may be disposed flush with the portions of the upper surface 26 disposed on opposite sides of the groove 30. Any misinclination of the shank portion 44 from a position normal to the aforementioned reference plane will result in one end of the plane surface 50 being elevated relative to the adjacent portions of the upper surface 26. The various dimensions of the gauge 22 are unimportant as long as the co-planar relationship of the plane surface 50 relative to the upper surface 26 is accomplished when the shank portion 44 is disposed normal to the aforementioned reference plane containing the center axes of the cylindrical feet 38.

The gauge 22 may be considered as a sine gauge and the distance between the center axes of the feet 38 is predetermined. For illustrative purposes the distance between the center axes of the feet 38 may be said to be 5 inches. With this known distance, the gauge 22 may be positioned on the upper surface 16 with one of the feet 38 contacting the upper surface 16 and the other of the feet 38 blocked in elevated position relative to the surface 16 through the utilization of a block 50 of a known vertical thickness and including parallel plane upper and lower surfaces. By using sine, cosine and tangent tables, a block 50 of a given heighth may be used to incline the reference plane defined by the center axes of the feet 38 a given amount relative to the upper surface 16. In this manner, when the shank portion 44 is chucked in the chuck 20 the angulation of the center axis of the chuck 20 relative to the upper surface 16 may be adjusted until such time as the plane surface 50 is co-planar with the upper surface 26. At this point, the chuck 20 will have its longitudinal axis disposed at the precise desired angle relative to the upper surface 16. Any slight misinclination of the chuck 20 relative to the upper surface 16 will be readily determinable, inasmuch as one end or the other of the plane surface 50 will be elevated relative to the upper surface 26. If the distance between the center axes of the feet 38 is 5 inches and the block 50 is one inch in heighth, the angulation of the shank portion 44 relative to the upper surface 16 will be 10 degrees when the plane surface 50 is flush with the upper surface 26.

Because any misinclination of the chuck 20 from the desired angle relative to the upper surface 16 may be readily determined by the plane surface 50 being in non-co-planar relation with the upper surface 26, further adjustment of the head 18 to the desired angle may be readily effected.

With attention now invited more specifically to FIGS. 4, 5 and 6 of the drawings, there may be seen a second form of gauge 122 which includes many features corresponding to the various features of the gauge 22 and which have therefore been designated by corresponding reference numerals in the 100 series. The gauge 122 includes a bar 124, but the bar 124 does not include a groove corresponding to the groove 30 but instead includes an upper surface 132 corresponding to the bottom 32 of the groove 30. Further, instead of including cylindrical feet corresponding to the feet 38, the gauge 122 includes spherical feet 138 carried by the lower ends of studs 139 secured in bores 141 formed in the bar 124. The upper ends of the studs 139 are precision ground flush with the upper surface 132 of the bar 124.

The gauge 122 includes an inverted T-head 140 pivotally mounted between a pair of side plates 132 secured to opposite sides of the bar 124 and the inverted T-head 140 includes a crosshead portion 142 and a shank portion 144. The opposite ends of the crosshead portion 142 include bores 143 formed therethrough equipped with threaded counterbores 145 and a pair of resetable dial gauges 147 are provided and include threaded mounting shank portions 149 adjustably threaded in the counterbores 145. The dial gauges 147 include reciprocal shanks 151 slidable through the bores 143 and equipped with spherical lower ends 153 for engagement with the upper ends of the shanks 139. The under surface 155 of the crosshead portion 142 is plane and parallels the upper surface 132 of the bar 124.

When the head portion 142 is positioned with the surfaces 132 and 155 parallel, the shank 144 is disposed normal to a plane containing the center axes of the feet 138 and the spacing between corresponding end portions of the surfaces 132 and 155 is identical.

Initially, a gauge block of a thickness equal to the spacing between the surfaces 132 and 155 illustrated in FIG. 5 the drawings may be interposed between either end of the crosshead portion 142 and the surface 132 and the dial gauges 147 may be adjusted, zeroed and locked in adjusted position. Then, the gauge 122 may be blocked in the manner in which the gauge 22 is blocked in FIG. 2 of the drawings and the shank portion 144 may be engaged by the chuck 20. Any misinclination of the chuck 20 from the desired angle determined by the blocking of the gauge 122 will be reflected, inversely, on the dial gauges 147 and the inclination of the tool head may be varied until the dial gauges 147 again read zero. Therefore, it may be seen that the gauge 122 may be used in a manner which is substantially similar to the manner in which the gauge 22 may be used.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A tool-to-work piece angle gauge comprising a base block having a pair of laterally spaced downwardly facing constant radius arcuate bearing surfaces generated about parallel axes lying in a reference plane, a shank assembly mounted from said base block for oscillation about a third axis paralleling said axes and including an exposed chank disposed and swingable in a plane normal to said third axis, said block and shank assembly including coacting indicating means operative to indicate when said assembly is rotated to a position about said third axis with said exposed shank disposed normal to said reference plane.

2. The angle gauge of claim 1 wherein said base block includes a first plane reference surface paralleling said reference plane and said assembly includes a second plane reference surface co-planar, coextensive with and adjacent said first reference surface when said exposed shank is disposed normal to said reference plane, said reference surfaces comprising said indicating means and each including portions thereof disposed on opposite sides of a diametric plane of said third axis normal to said reference plane.

3. The angle gauge of claim 1 wherein said base block includes first plane reference surface portions paralleling said reference plane and a pair of dial gauges adjustably supported from said shank assembly on opposite sides of a diametric plane of said third axis normal to said reference plane and inversely movable toward and away from said reference surface portions responsive to oscillation of said shank assembly relative to said base block about said third axis.

4. The angle gauge of claim 1 wherein said shank assembly and base block include opposing spaced apart plane surfaces which parallel each other when said exposed shank is disposed normal to said reference plane, said plane surfaces including portions of each disposed on opposite sides of a diametric plane of said third axis normal to said reference plane.

5. The angle gauge of claim 4 wherein said arcuate bearing surfaces comprise portions of spherical bearing members carried by said base block.

6. The angle gauge of claim 1 wherein said base block includes a first plane reference surface paralleling said reference plane and said assembly includes a second plane reference surface co-planar, coextensive with and adjacent said first reference surface when said exposed shank is disposed normal to said reference plane, said reference surfaces comprising said indicating means and each including portions thereof disposed on opposite sides of a diametric plane of said third axis normal to said reference plane, said base block defining a groove in said first reference surface normal to said parallel axes, said shank assembly being oscillatably mounted within said groove, said second reference surface, when said exposed shank is disposed normal to said reference plane, being disposed between and flush and coextensive with the portions of said first reference surface disposed on opposite sides of said groove.

7. The angle gauge of claim 6 wherein said arcuate bearing surfaces comprise cylindrical bearing surfaces.

* * * * *